United States Patent
Wilsher et al.

(10) Patent No.: US 10,166,790 B1
(45) Date of Patent: Jan. 1, 2019

(54) DYNAMIC PRINT MEDIA WEIGHT DETERMINATION SYSTEM AND METHOD

(71) Applicant: Xerox Corporation, Norwalk, CT (US)

(72) Inventors: Michael John Wilsher, Letchworth Garden City (GB); Simon Neil Jowett, St Albans (GB); Paul Simon Golding, Hertford (GB); Stephen Canning, Baldock (GB)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/671,259

(22) Filed: Aug. 8, 2017

(51) Int. Cl.
| | |
|---|---|
| *B41J 2/435* | (2006.01) |
| *B41J 11/00* | (2006.01) |
| *G01G 19/03* | (2006.01) |
| *G03G 15/00* | (2006.01) |
| *B65H 7/02* | (2006.01) |
| *B41J 13/10* | (2006.01) |

(52) U.S. Cl.
CPC ......... *B41J 11/0095* (2013.01); *G01G 19/03* (2013.01); *G03G 15/5062* (2013.01); *B41J 13/10* (2013.01); *B65H 7/02* (2013.01); *B65H 2511/13* (2013.01); *B65H 2511/22* (2013.01); *B65H 2553/61* (2013.01); *B65H 2557/61* (2013.01)

(58) Field of Classification Search
None
See application file for complete search history.

(56) References Cited

U.S. PATENT DOCUMENTS

| | | | |
|---|---|---|---|
| 5,138,178 A | 8/1992 | Wong et al. | |
| 5,406,363 A | 4/1995 | Siegel et al. | |
| 5,934,140 A * | 8/1999 | Jackson | G01N 33/346 |
| | | | 250/559.27 |
| 9,604,478 B1 | 3/2017 | Montfort et al. | |
| 2003/0126931 A1 | 7/2003 | Clark | |
| 2003/0200815 A1 | 10/2003 | Clark | |
| 2003/0205093 A1 | 11/2003 | Clark | |
| 2004/0217539 A1 | 11/2004 | Clark | |
| 2005/0280205 A1 | 12/2005 | Kneirim | |
| 2006/0066885 A1 | 3/2006 | Anderson et al. | |
| 2007/0053711 A1 | 3/2007 | Litwiller | |
| 2008/0185773 A1 | 8/2008 | Yamamoto | |
| 2012/0000715 A1 * | 1/2012 | Saigh | G01G 19/027 |
| | | | 177/25.18 |
| 2012/0004087 A1 | 1/2012 | Tharayil et al. | |

* cited by examiner

Primary Examiner — Matthew Luu
Assistant Examiner — Tracey McMillion
(74) Attorney, Agent, or Firm — Fay Sharpe LLP (57) ABSTRACT

A printing device includes a print media pathway connecting a print media source with a marking component. A flexible member, positioned in the pathway, is deflected by a moving sheet of media to be printed by the marking component. A sensor system outputs a signal in response to a detected deflection of the flexible member. A weight output component outputs a weight-related value for the sheet based on the output signal. The weight-related value may correspond to one of a predefined set of print media weight ranges, each range associated with one or more respective settings for the printing device. An adjustment component adjusts the settings of the printing device based on the weight-related value. This allows the printing device to respond dynamically to changes in print media weight without the need to be provided with the weight of the print media currently installed in the printer by a user.

18 Claims, 6 Drawing Sheets

DYNAMIC PRINT MEDIA WEIGHT DETERMINATION SYSTEM AND METHOD

BACKGROUND

The exemplary embodiment relates to printing devices and and more particularly to printing devices that can print on print media of different weights.

Printing devices, such as printers, copiers, and multifunction devices including them, render images on sheets of print media. The print media, which is generally paper, but can be another flexible substrate, is fed from a media supply component along a paper path that carries the sheets to a marking component, which renders the images on the sheets using a marking medium, such as inks, toners, or the like. The media supply component may include one or more paper trays. The print media installed in the trays may be of different sizes, thicknesses, and weights (expressed as basis weights or wt/unit area). The basis weight of a sheet of paper is generally expressed in terms of the weight (e.g., in pounds) of a ream (500 sheets) of that paper. The wt/unit area of a sheet is usually expressed in grams/m$^2$ (gsm or grammage).

The weight of the paper influences the settings used by the printer, e.g., for operating the paper path and the marking component. The paper weight is often manually entered by the user, and thus is prone to error.

Various methods have been developed for automatic detection of paper properties. Vacuum systems have been developed for measuring bending stiffness, as disclosed, for example, in U.S. Pub. Nos. 20030126931, 20030200815, 20030205093, and 20040217539 to Clarke. It is also known to have in-line sensors which detect sheet thickness through displacement of a nip idler roller as disclosed, for example, in U.S. Pub. No. 20050280205 to Knierim. A sheet beam strength sensor, which measures a beam strength and curl characteristics signature profile, is disclosed, for example, in U.S. Pat. No. 9,604,478 to Montfort, et al. A basis weight sensor using an infrared emitter and a phototransistor receptor are described in U.S. Pat. No. 5,138,178 to Wong, et al.

INCORPORATION BY REFERENCE

The following references, the disclosures of which are incorporated herein in their entireties by reference, are mentioned:

U.S. Pub. Nos. 20030126931, 20030200815, 20030205093, 20040217539, entitled SUBSTRATE BENDING STIFFNESS MEASUREMENT METHOD AND SYSTEM, by Clark.

U.S. Pub. No. 20050280205, published Dec. 22, 2005, entitled PRINT MEDIA THICKNESS MEASUREMENT SYSTEM, by Knierim.

U.S. Pub. No. 20060066885, published Mar. 30, 2006, entitled PRINTING SYSTEM, by Anderson, et al.

U.S. Pub. No. 20070053711, published Mar. 8, 2007, entitled AUTOMATED DUPLEX PRINTING OF HEAVYWEIGHT SHEETS IN SPECIAL SIMPLEX MODE, by Litwiller.

U.S. Pub. No. 20080185773, published Aug. 7, 2008, entitled SHEET PROCESSING APPARATUS AND SHEET PROCESSING METHOD, by Yamamoto.

U.S. Pub. No. 20120004087, published Jan. 5, 2012, entitled DYNAMIC SHEET CURL/DECURL ACTUATOR, by Tharayil, et al.

U.S. Pat. No. 5,138,178, issued Aug. 11, 1992, entitled PHOTOELECTRIC PAPER BASIS WEIGHT SENSOR, by Wong, et al.

U.S. Pat. No. 5,406,363, issued Apr. 11, 1995, entitled PREDICTIVE FUSER MISS-STRIP AVOIDANCE SYSTEM AND METHOD, by Siegel, et al.

U.S. Pat. No. 9,604,478, published Mar. 28, 2017, entitled PRINT MEDIA BEAM STRENGTH SENSOR, by Montfort, et al.

BRIEF DESCRIPTION

In accordance with one aspect of the exemplary embodiment, a printing device includes a flexible member positioned in a print media pathway, which is deflected by a moving sheet to be printed. A sensor system outputs a signal in response to a detected deflection of the flexible member. A weight output component outputs a weight-related value for the sheet based on the output signal. An adjustment component adjusts a setting of the printing device based on the weight-related value. As an example the weight of the media affects the amount of heat transferred by the fuser. For higher media weights the fuser temperature may therefore be increased to maintain the quality of fusing.

In accordance with another aspect of the exemplary embodiment, a printing method includes receiving a signal output by a sensor system associated with a flexible member positioned in a print media pathway of a printing device, when the flexible member is deflected by a moving sheet to be printed. A weight-related value is determined for the sheet, based on the output signal. A setting of at least one component of the printing device is adjusted, based on the weight-related value. After the adjusting, the sheet is printed with the printing device.

In accordance with another aspect of the exemplary embodiment, a dynamic print media weight detection system includes a sensor system. The sensor system outputs a digital signal in the form of a pulse in response to a detected deflection of an associated flexible member positioned in a print media pathway of an associated printing device, when the flexible member is deflected by a moving sheet to be printed. A weight output component determines a rise time from the digital signal pulse and assigns a weight-related value to the sheet based on the rise time.

DETAILED DESCRIPTION

As used herein, "print media" can be a usually flimsy physical sheet of paper, plastic, or other suitable physical print media substrate for images.

An "image" generally may include information in electronic form which is to be rendered on the print media by a printing device and may include text, graphics, pictures, and the like.

A "printing device" can be any device for applying an image to print media, using a marking material, such as ink(s) or toner(s). Example printing devices include printers, scanners, fax machines, and multifunction devices having two or more of these functionalities.

Unless specified, as used herein "print media weight" or "paper weight" refers to a property of the print media which is a function of its weight, such as basis weight or g/m².

Figure 1:
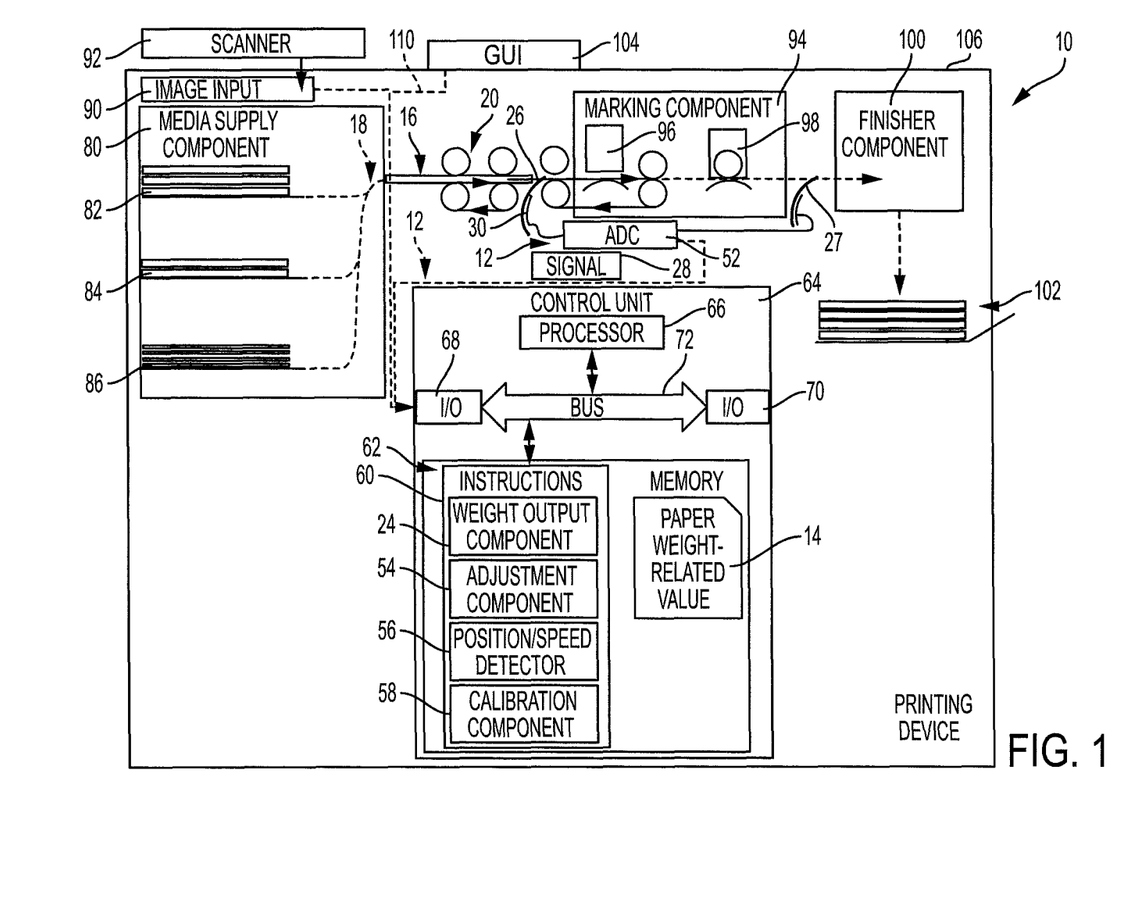
FIG. 1 is a side sectional view of a printing device with a print media weight detection system in accordance with one aspect of the exemplary embodiment.

With reference to FIG. 1, a printing device 10 includes a print media weight detection system 12, which determines a weight-related value 14 for sheets 16 of print media (e.g., paper, not to scale) as they are conveyed along a print media path 18 by a sheet conveyor system 20. The conveyor system 20 may include various sheet feeding devices (e.g., rollers, nips, conveyor belts, baffles, etc.) within the printing device 10. The weight detection system 12 determines the weight-related value 14 for a sheet while the sheet is being conveyed by the sheet conveyor system 20, allowing dynamic updates to settings for printing device components to accommodate changes in weight of the print media being supplied to the printing device.

Figure 2:
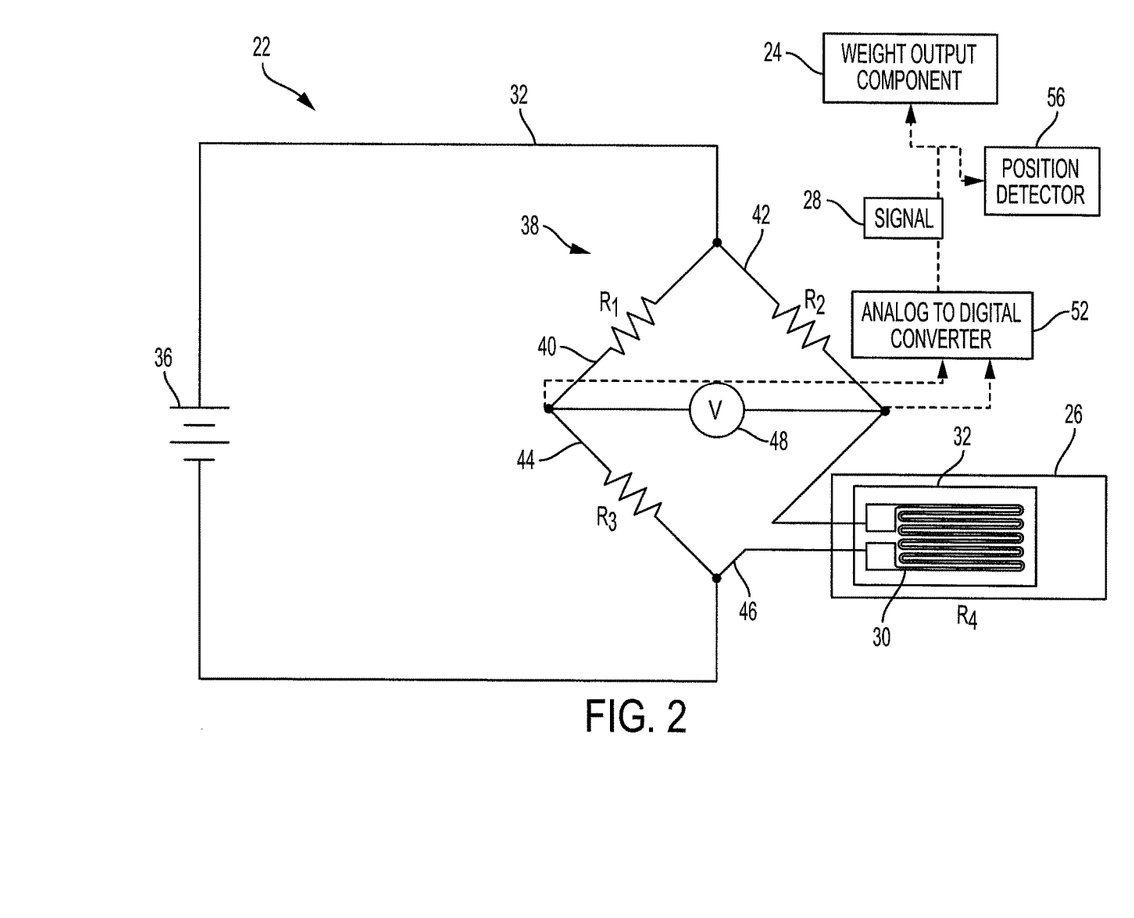
FIG. 2 is an enlarged view of the print media weight detection system of FIG. 1.

With reference also to FIG. 2, the weight detection system 12 includes a sensor system 22 and a weight output component 24. The sensor system 22 detects changes in a flexible member 26 when contacted by the moving sheet 16, and outputs a signal 28 based thereon. The flexible member 26 extends into the print media path 18 and is positioned to intercept a leading edge of the moving paper sheet. As the moving sheet 16 makes contact with the flexible member 26, the flexible member 26 is deflected, allowing the sheet 16 to continue along the paper path 18. While a single flexible member 26 is shown, the printing device 10 may include more than one flexible member, e.g., set of flexible members 26 positioned in the paper path, e.g., a sequence of two or more flexible members, one downstream of another.

The material and thickness of the flexible member is selected such that the flexible member operates in the elastic region of the stress strain curve. The flexible member thus returns substantially to its original shape after the print media sheet 16 has passed by, and the material is not permanently deformed or suffers fatigue over time.

The flexible member 26 may be formed from plastic, metal, or the like. Suitable plastics include polyester films, such as such as Mylar® films. The member may be, for example, from 0.1-2 mm in thickness (in the machine direction), from 0.5 to 5 cm in length, and from 0.5-2 cm in width (in the cross-machine direction, i.e., the dimension generally parallel to the leading edge of the sheet 16). One suitable film from which the flexible member 26 may be formed is a DuPont Teijin Films Mylar® EL21 Polyester Film, 750 gauge (about 0.2 mm).

The illustrated sensor system 22 includes a strain gauge 30, which is electrically connected to a strain gauge circuit 32. The strain gauge 30 is mounted to the flexible member 26, e.g., with an adhesive, such as an epoxy resin, phenol-epoxy resin, or pressure-sensitive adhesive, e.g., a cyano-acrylate. In the illustrated embodiment, the strain gauge 30 is pre-mounted to a flexible strip 32 formed from a polymer such as a polyester or polyimide, which may have an adhesive backing suitable to mount the strain gauge to the flexible member 26. In other embodiments, the strain gauge may be printed on the flexible member. The strain gauge 30 may be formed from resistance wire (e.g., fine nichrome track) which is convoluted in shape, terminating in current input and output tabs. When the flexible member 26 is deflected by the sheet, the resistance of the strain gauge 30 changes. The elastic deformation or bending region of the flexible member 26 and strain gauge together form a flexible deformation detector. The deflection of the flexible member 26 causes a detectable and reversible change in the properties of the sensor system, due to the mechanical strain, which can be used to detect the weight and/or the position of the sheet.

The type of strain gauge is not limited, however, suitable foil strain gauges are sold under the name RS Pro by RS Components Ltd., United Kingdom.

The exemplary strain gauge circuit 32 includes a voltage source 36, such as a battery or other DC source, which maintains a stable voltage across a resistor assembly 38, such as a Wheatstone bridge. The source may provide a voltage of about 2-5 volts across the resistor assembly 38. The Wheatstone bridge 38 includes resistors $R_1$, $R_2$, and $R_3$ defining three of its four connected sides 40, 42, 44, 46, with the resistance of the fourth side 46 varying as a function of the resistance of the strain gauge 30 connected thereto.

In one embodiment, the entire resistor assembly 38 may be supported by, e.g., may be directly formed on or attached to, the flexible member 26. In another embodiment, the strain gauge may be connected to the leg 46 by electrical wires. In one embodiment, the resistor assembly 38 may be temperature-compensated to take into account ambient temperature fluctuations. For example, an array of dummy, inactive, strain gauges may be used for compensating for drift cause by changes in temperature.

The strain gauge circuit 32 generates a voltage signal 48, which is a function of the input voltage from the source 36, resistances $R_1$, $R_2$, and $R_3$ and strain gauge resistance $R_4$, and thus varies as a function of the deflection force applied to the flexible member 26 by the sheet. In particular, the voltage output 48 of the strain gauge circuit 32 is a function of the bending stiffness (beam strength) of the flexible member, i.e., the ease with which the print media deforms when hitting the flexible member. In practice, a beam strength of below 2 Nmm has a good correlation to a paper gsm<125, a beam strength of from 2 to 8 has a good correlation to a paper gsm of between 125 and 220, and a beam strength>8 is a good correlation to a gsm>220. This coarse binning of the paper weights is sufficient to allow improvements in the fuser settings and image quality; exact determination of paper weight is not required.

An embodiment with a single strain gauge 30 and resistive non active legs 40, 42, 44, as shown in FIG. 2, is sufficient for most applications. The bridge 38 is excited with a simple DC voltage and the voltage signal 48 can be sensed in a number of ways.

The analog voltage signal 48 may be converted to the digital signal 28 by an analog-to-digital converter (ADC) 52. The digital signal 28 is in the form of a pulse, which has a profile which is indicative of the weight of the print media when the speed of the print media/paper path is known. In particular, the signal 28 increases, from a baseline voltage value, as the sheet flexes, reaches a maximum value shortly before the sheet overcomes the physical resistance of the flexible member, and then decreases towards the baseline voltage as the sheet passed downstream from the flexible member. The recorded output voltage signal 28 need not include the entire pulse, or it may include an entire pulse or may include several pulses (or parts thereof) corresponding to several sheets of paper.

The ADC 52 may simply be a comparator, which compares the voltage 48 with a baseline (inactive) voltage. Although this does not allow automatic zeroing of the system to compensate for manufacturing tolerances it does allow for high speed operation. A more complex circuit may be used to allow automatic zeroing of the system to compensate for manufacturing tolerances. The ADC 52 may be configured to convert analog voltages 48 from two or more strain gauge circuits 32, allowing for more than one flexible member to be used in the paper path. In one embodiment, the ADC is controlled via a serial interface and may also allow the gain to be set and the non-active state to be monitored and used to zero the detected voltages. The ADC may include a built-in temperature sensor, which allows the output signal 28 to be adjusted for changes in ambient temperature around the strain gauge and/or strain gauge circuit.

Example ADCs 52 useful herein have a reaction time which is able to cope with rapid voltage changes, as may occur in high speed printing devices. Examples include an HX711 24-bit ADC, sold by Avia Semiconductor, China. This device has two channels: the first can be programmed with a gain of 128 or 64, corresponding to a full-scale differential input voltage of ±20 mV or ±40 mV respectively, when a 5V supply is used, while the second channel has a fixed gain of 32. It also includes a zeroing element, however the sampling rate is relatively slow. For higher speed printing devices, a suitable ADC may be an AD7091 12-bit ADC, sold by Analog Devices Norwood, Mass. 02062, which can take up to 1 million samples/second from the analog voltage output.

The weight output component 24 generates the weight-related value 14, based on the signal output 28 of the sensor system 22. In one embodiment, this may include assigning the sheet 16 to one of a predefined set of two or more print media weight value ranges (bins), each bin corresponding to a (non-overlapping) print media weight range, as described in further detail below.

As illustrated in FIG. 1, the exemplary printing device 10 includes an adjustment component 54, which adjusts one or more settings of the printing device, based on the print media weight value 14 output by the weight output component 24. The printing device may additionally include a position and/or detector, 56, which detects a position and/or speed of the sheet 16, based on the signal 28 output by the sensor system 22, and/or a calibration component 58, which calibrates the weight output component, given sensor signals 28 for sheets 16 of different known weights.

In some embodiments, one or more of the weight output component 24, adjustment component 54, position/speed detector 56 and calibration component 58 is omitted from the printing device.

In one embodiment, one or more of the weight output component 24, adjustment component 54, position/speed detector 56 and calibration component 58 is/are in the form of software instructions 60 stored in memory 62 of a printer control unit 64. The illustrated control unit 64 also includes a processor 66, which executes the instructions 60, and one or more input/output (I/O) devices 68, 70, which enable the control unit 64 to communicate with other components of the printing device 10. Hardware components 62, 66, 68, 70 of the control unit may communicate via a data/control bus 72.

The illustrated printing device 10 includes a print media supply component 80, which includes a set of one, two, or more print media sources, such as trays 82, 84, 86, which may vary in configuration for accepting different types/sizes of print media, such as paper sheets 16 of different weights. In the exemplary embodiment, a first of the paper trays 82 may hold print media sheets having a first weight and a second of the paper trays 84 may hold print media sheets having a second weight, different from the first weight. As an example, paper tray 82 may hold letter size paper of about 24 lb/ream basis weight (equivalent to 90 g/m$^2$) and paper tray 84 may hold letter size paper of about 32 lb/ream basis weight (equivalent to 120 g/m$^2$), and so forth.

An image input unit 90 includes a scanner 92 and/or other digital input device, such as a USB port or a wired or wireless connection to a print server or personal computer, for receiving/generating an image of a document to be rendered on print media. The digital images may be processed by the control unit 64 to put them in a suitable format for printing.

A marking component 94 includes one or more marking engines (print engine(s)) which render(s) the image on print media, supplied by the media supply component 80, using marking media, such as inks or toners. The illustrated marking engine includes a transfer component 96, such as a corotron, which transfers the image, in the form of electrically-charged toner particles, to the sheet 16. At this stage, the sheet is electrically charged so as to attract the toner particles. The marking engine 94 also includes a fuser 98, which causes the applied toner particles to be fixed to the sheet, e.g., by application of heat. As will be appreciated, the marking component 94 may be configured for printing in any combination of monochrome/multi-color printing, single sided/duplex printing, and/or may be configured for use with ink(s) and/or other marking material in order to generate printed media by applying an image to the sheets of print media.

A finisher component 100 receives the printed media from the marking component 94 and optionally provides one or more finishing operations, such as collating, stapling, binding, stacking, or the like. A print media output component 102, such as an output tray or trays, outputs the optionally finished, printed media. Components 80, 94, 100, 102 are connected by the print media path 18, which transports the print media 16 from the media supply component 32 to the print media output component 102, via the marking component 94 and (optional) finisher component 100.

A user interface device (GUI) 104 is mounted to an exterior housing 106 of the printing device 10 and includes a display device, such as an LCD screen, which allows a user to view and/or control various printer settings. For example, the user may select to print a print job comprising one or more sheets using print media 16 supplied from tray 82. If the user does not make a particular tray selection, one of the trays may be selected by default.

The exemplary control unit 64 is communicatively connected with the conveyor system 20, media supply component 80, image input component 90, user interface 104, marking component 94 and finishing component 100. The connections may be made by wired or wireless connections 110 to input/output (I/O) devices 68, 70, for controlling settings and/or functions of the hardware printer components 20, 80, 90, 94, 100, and 104, and/or receiving information therefrom. The control unit 64 may be located within the housing 106 or may be wholly or partially located elsewhere, such as on a network print server (not shown). While the weight output component 24 is illustrated as part of the control unit, it may be at least partly hosted a separate component including memory and a processor analogous to the control unit, e.g., in the form of a microprocessor or similar hardware.

The control unit 64 receives information from the image input component 90, such as digital image data generated by scanning a physical document. The control unit 64 receives media information from the media supply component 80, such as the tray from which the print media is being provided and/or an identifier of the type of print media.

The control unit 64 outputs GUI information to the user interface device 104 for generating the GUI and receives user input information from the user interface 104 corresponding to user inputs to the user interface. The user may interact with the user interface via a user input device, such as a touch screen of the display device, buttons, combination thereof, or the like.

The control unit 64 may also control various processing and operating functions of the apparatus 10, such as copying, printing, paper feeding, finishing, and the like. In particular, the adjustment component 54 adjusts settings such as a fuser setting for the fuser 98 and/or a transfer setting for the transfer component 96. The fuser setting controls the temperature of the fuser 98, which may be increased when the weight output component detects a higher weight (higher gsm) sheet (since higher weight sheets tend to absorb more heat from the fuser, reducing its temperature) or lowered when the weight output component detects a lower weight sheet. The transfer setting may be used to adjust a voltage applied to the sheet by the transfer component 96. Higher weight (higher gsm) sheets generally need to be charged to a higher voltage than lower weight sheets, to attract the toner particles. The adjustment component may also adjust the sheet conveyor system 20, e.g., adjusting roller and belt speeds and so forth, based on the determined print media weight value. For example, if the paper weight value changes to a higher (resp. lower) weight, the adjustment component may cause the sheet conveyor system to slow down or stop, or cause the sheet of paper to be held by a restraining device, such as a baffle, for a short period to allow the fuser temperature to be raised (resp. lowered) to fix the images adequately to the higher (resp. lower) weight paper.

In some embodiments, the position detector 56 uses the output of the ADC 52 to determine the position (location and/or orientation) of the sheet on the paper path. In one embodiment, the location of the flexible member 26 is known. The control unit 64 may receive, from the ADC, a time at which the voltage change caused by the deflection of the member reaches a threshold value. This is used to identify the location of the leading edge of the sheet at that time. In another embodiment, a time at which the voltage change caused by the deflection of the member has begun to drop back to its normal value, may be used to detect a location, on the paper path, of the trailing edge of the sheet.

The control unit 64 may include one or more computing devices, such as a central processing unit, microprocessor, or other computing device capable of executing instructions for performing the exemplary method. The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 66 and memory 62 may be combined in a single chip. Memory 62 stores instructions for performing the exemplary method as well as the processed data 14. The digital processor device 66 can be variously embodied, such as by a single-core processor, a dual-core processor (or more generally by a multiple-core processor), a digital processor and cooperating math coprocessor, a digital controller, or the like. The I/O interfaces 68, 70 may comprise a modulator/demodulator (MODEM) a router, a cable, and/or Ethernet port.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary marking engine 94 may include many of the hardware elements employed in the creation of desired images by electrophotographical processes. The marking engine typically includes a charge retentive surface, such as a rotating photoreceptor in the form of a belt or drum, from which the latent images are transferred to the sheet by the transfer corotron 96. The fuser 98 generally applies at least one of heat and pressure to the sheet to physically attach the toner to the printed media. While particular reference is made to electrophotographic printers, suitable marking engines may also include ink-jet printers, including solid ink printers, thermal head printers that are used in conjunction with heat sensitive paper, and other devices capable of marking an image on a substrate.

To provide the adjustment component 54 with sufficient time to make adjustments to the marking engine and/or other components of the printer dynamically, the flexible member may be positioned in the paper path upstream of the marking component 94, e.g., between the media supply component 80 and the (first) marking engine, or within the media supply component itself. A separate flexible member and strain gauge could be supplied for each paper tray. However, in the illustrated embodiment, all or at least some of the paper trays 82, 84, 86 feed into a common portion of the print media pathway 18 and the flexible member and strain gauge are positioned downstream of the start of the common portion.

In one embodiment, illustrated in FIG. 3, the flexible member 26 carrying the strain gauge 30 extends into the paper path from below the paper path. In another embodiment, illustrated in FIG. 4, the flexible member carrying the strain gauge extends into the paper path from above the paper path.

In one embodiment, the printing device 10 includes only a single flexible member 26 positioned in the paper path 18 and having an associated strain gauge 30 attached thereto. In another embodiment, the printing device includes two or more flexible members and respective strain gauges. The two or more flexible members may be spaced along the paper path, i.e., one downstream of another. Or, they may be positioned across the paper path, generally parallel with a leading edge of the moving sheets 16.

Figure 3:
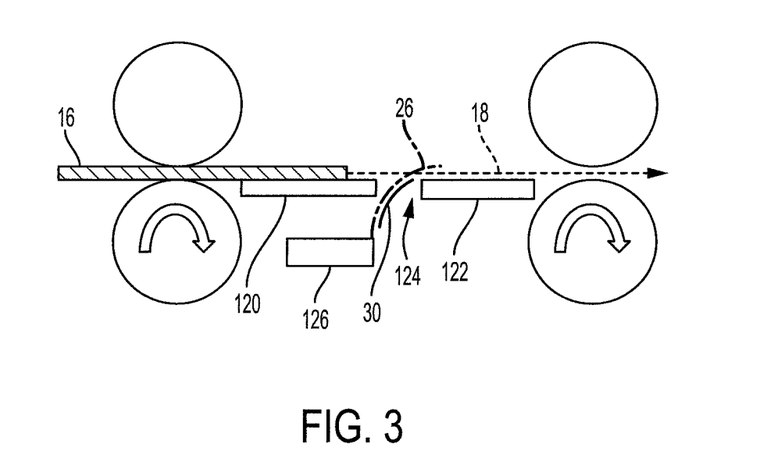
FIG. 3 illustrates positioning of a flexible member of the print media weight detection system in the print media path in accordance with a first exemplary embodiment.
Figure 4:
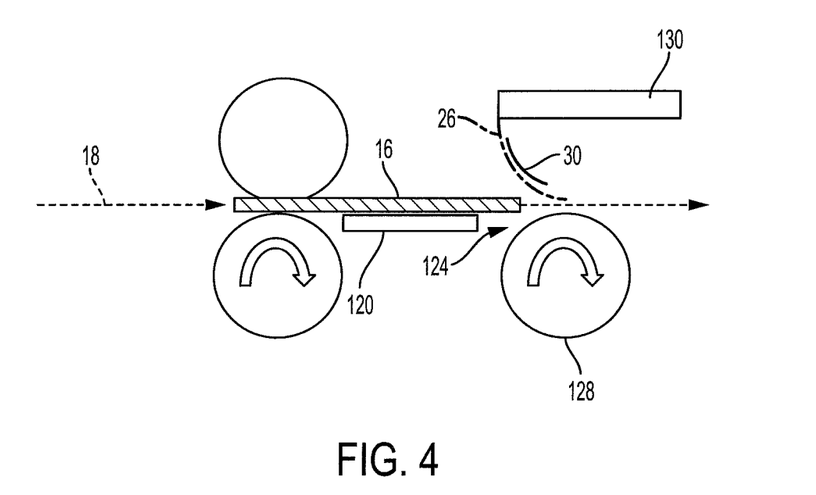
FIG. 4 illustrates positioning of the flexible member in the print media path in accordance with a second exemplary embodiment.

As shown in FIG. 3, the sheet may be supported on fixed members 120, 122 (and/or moving members of the conveyor system 20), which are spaced by a gap 124. The flexible member (or strain gauge wires) may be supported on a rigid support member 126 positioned below the gap. As shown in FIG. 4, the sheet may be supported on fixed/moving members 120, 128 of the conveyor system 20, and the flexible member (or strain gauge wires) may depend from a rigid support member 130 positioned above one or both of the members 120, 128 and/or above a gap 124 which spaces them.

In one embodiment, the flexible member 26 forms a part of the paper path, as illustrated in FIG. 4. For example the flexible member 26 may be positioned to constrain the sheet 16 such that the sheet makes contact with the conveyor system guide member 128, which may be a drive roller or driven roller, a conveyor belt, or the like. In another embodiment, the flexible member 26 is separate from the paper path, as illustrated in FIG. 3.

If the sensor is integrated into an existing flexible guide, such as the guide 26 shown in FIG. 4, the guide may flex as the roller 128 rotates. Thus, the voltage signal 48 received in the non-active state (no paper in contact with the member 26) may vary. However, this will generally be a gentle cyclic signal. The ADC 52 or control unit can be configured to distinguish this signal from the pulse signal generated by the sharp impact of the paper edge, e.g., by setting a threshold on the voltage change and/or rate of voltage change.

Figure 5:
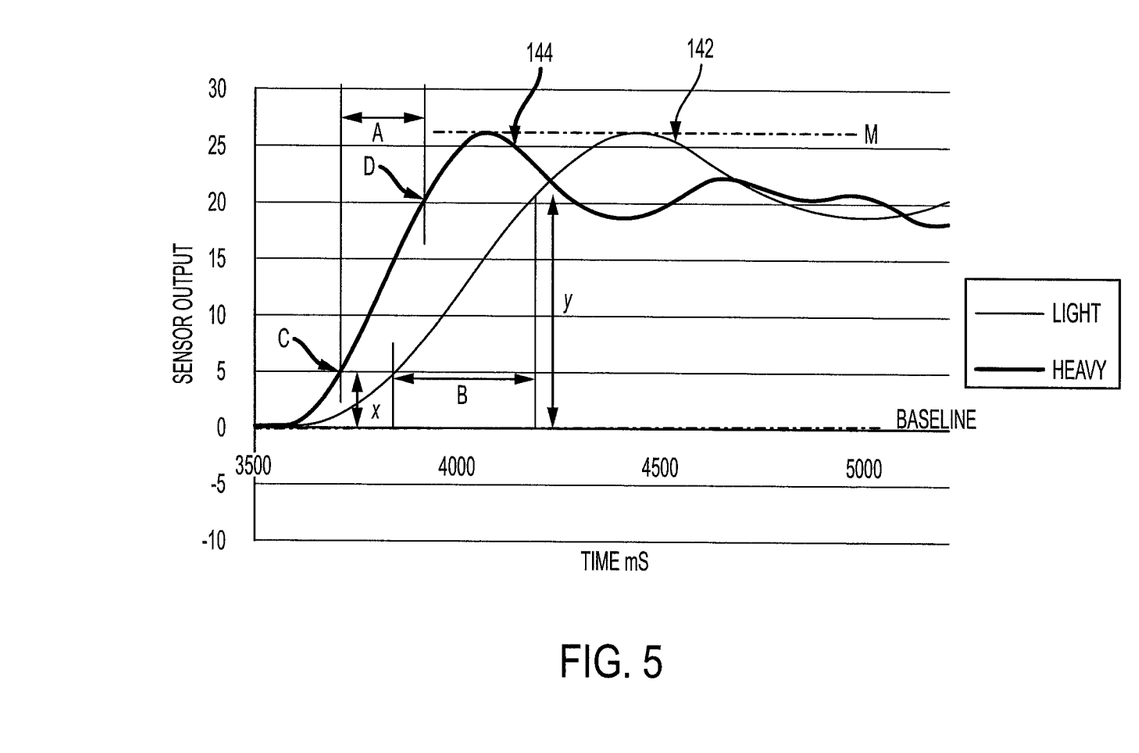
FIG. 5 is a plot simulating sensor output over time for different paper weights.

The voltage signal 28 output by the ADC 52 may have a profile which varies depending on the weight of the paper. With reference now to FIG. 5, simulations of two illustrative profiles 142, 144 are shown, for a light weight paper and for a heavy weight paper, respectively. The profiles are shown for the same paper path speed, since this can influence the profile. However, the relative shapes of the two (or more) paper weight profiles is similar for different path speeds. As can be seen, the reaction time for the same sensor is slower for the light weight paper than for the heavy weight paper. Lightweight paper tend to give a longer rise time as the sheet tends to buckle slightly as it builds up force to overcome the bending moment of the sensor. Heavyweight papers tend to actuate the sensor faster for a given process speed.

Two or more points in the profile 142, 144 can be used to derive the paper weight-related information. In one embodiment, a rise time A, B is determined. The rise time is a function of the amount the sheet deforms as it hits the sensor, this is related to beam strength and the paper beam strength has a correlation to paper weight. The rise time is determined as the time between the intersection of the profile with first and second thresholds (first and second sensor outputs). The first threshold x can be defined as a percentage of the maximum sensor output M (which is determined relative to a baseline output B in the inactive state). The second threshold y can be defined as a percentage of the maximum sensor output M, where y is greater than x. x can be, for example, from 5-40% of the maximum sensor signal value M, and y can be, for example, from 70-90% of the maximum sensor signal value. Alternatively, if the sensor output is controlled so that the maximum value M is a fixed value, x and y can be defined at first and second sensor outputs, such as 5 and 20 millivolts respectively, in the illustrated examples.

In the case of FIG. 5, for example, rise time A=D−C, where D is the time at which sensor threshold y is reached and C is the time at which sensor threshold x is reached. The rise time is approximately proportional to the sheet weight, given a fixed paper path speed. This allows the paper to be categorized into one of a set of weight-related categories. For example a first rise time range (in ms) is associated with a first of the weight-related categories, a second rise time range (higher than the first, in ms) is associated with a second of the weight-related categories, and so forth. The number of weight-related categories is not limited and can be, for example, at least two, or at least three, or at least four, and in some embodiments, is up to ten, or up to five.

Figure 6:
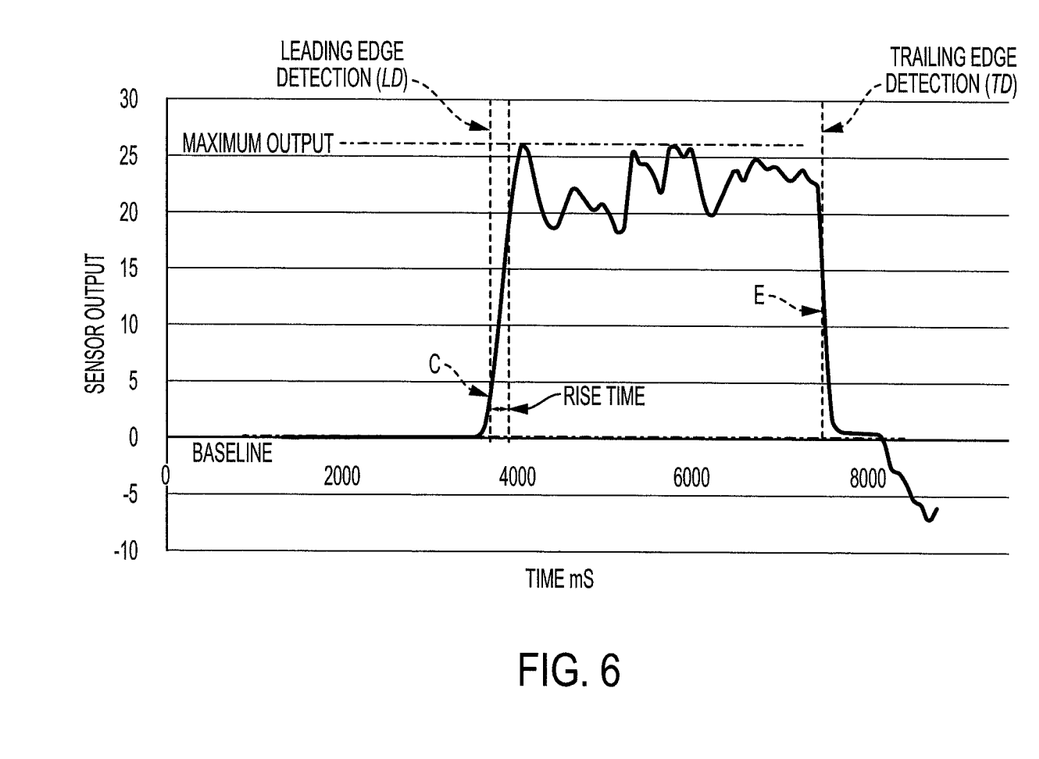
FIG. 6 is a plot simulating sensor output over time for position detection.

In one embodiment, where the printing device can be set to different paper path speeds, the sensor signal 28 and/or computed rise time A, B may be adjusted to take into account the paper path speed. In this way, the assigned weight-related category is approximately independent of the path speed. Printer speeds may correspond to different outputs, such as from about 30 to 120 pages per minute (ppm), which corresponds to paper movement of about 200 to 450 mm/sec. In one embodiment, the path speed is computed based on the sensor signal 28 from one or more sensor systems 22. As illustrated in FIG. 6, for example, the sensor output for the whole sheet is shown. The sensor can thus the used for lead and/or trail edge detection in addition to weight detection.

The paper path speed can be determined, for the same sheet as $$\frac{\text{length of sheet}}{TD - LD},$$

or as a function thereof, where TD is the time at which the trailing edge of the sheet is detected and LD is the time at which the leading edge of the sheet is detected. Or, for consecutive sheets, the paper path speed can be determined as $$\frac{\text{pitch}}{LD1 - LD2}$$

where LD1 and LD2 are the times at which the leading (or trailing) edge of each sheet is detected the pitch is the distance between the same point on the two consecutive sheets. LT may correspond, for example, to point C on the profile (the start of the rise time), while DT may correspond, for example, to the time E on the profile at which the sensor output drops to z % of the maximum or to a fixed value of z. In another embodiment, sensor signals from two flexible members 26, 27 (FIG. 1) that are spaced a fixed distance apart on the paper path 18 may be used to compute the paper path speed. Another component may alternatively be used to determine the paper path speed, such as a laser sensor.

In one embodiment, the printer device 10 is calibrated using different papers of known weights. For example, at a given printer speed, the printer device (or an equivalent printer device of the same configuration) is fed with sheets of a first print media weight (first grammage) and the rise time computed (e.g., averaged over several sheets of paper). The printer device (or an equivalent printer device of the same configuration) is then fed with sheets of at least a second print media weight (second grammage) and the rise time computed (e.g., averaged over several sheets of paper). The computed rise times are fed to the calibration component 58, which may adjust the range of rise times associated with each bin based thereon, so that each sensor rise time range corresponds to a predetermined paper weight range. Subsequently, during printing, another sheet of paper can be assigned to one of the calibrated set of paper weight bins, based on its computed rise time. Thus, accurate or precalibrated sensors are not required and can be characterized in the device at manufacture, the control unit saving the relevant operating points.

The characterization for different bands of paper weight, and hence a specific band, can be determined from the signal profile as the sheet is fed and the control unit 64 can be informed and printer settings adjusted accordingly. This method can also reduce the user input, since the user need not be required to know or correctly enter the paper weight.

As an example, suppose that there are two paper weight bins corresponding to ≤120 gsm and >120 gsm, respectively. Different printing settings are associated with each of the two weight bins.

For a light/heavyweight determination a switch point S (e.g., in ms) can be set above rise time A and below rise time B, as shown in Table 1. Paper sheets with rise times in the rise time range≤S are assigned to the light paper bin and the predetermined settings for light paper are retrieved by the control unit adjustment component and implemented on the printing device. Otherwise, the settings for heavy weight paper are used. In cases where more bins are used, two or more switch points S1, S2, etc., may be used, and the printer settings selected accordingly.

TABLE 1

Example paper weight bins

| Sensor Characterization | Selected Band | Printer setting |
|---|---|---|
| Rise time ≤ S | Light | Light |
| Rise Time > S | Heavy | Heavy |

As will be appreciated, other properties of the paper, such as orientation, stiffness, curl, and the like may affect the sensor differently for the same weight of paper. However when the binning is fairly coarse, these factors do not influence the effectiveness of the system. However, it is also contemplated that compensation may be applied, e.g., for differences in the paper orientation.

In one embodiment, the weight-related value 14 for one or more initial sheets is determined for each tray, for example, each time the tray is opened and closed. The remaining tray content can then be annotated with the associated paper weight value. If the paper weight value is determined to have changed to a different value/bin from that previously associated with the tray, then the first sheet from the tray can be stopped in the paper path, to allow time for adjustments to the printer settings to be made and for printer components, such as the fuser, to equilibrate at the new settings. Thus, for example, if the fuser is set to a higher (lower) operating temperature to accommodate higher (lower) weight paper, the paper may be stopped in the paper path upstream of the fuser for sufficient time for the fuser to reach the higher (lower) temperature by the time the paper reaches the fuser.

In another embodiment, the weight-related value 14 is determined repeatedly, e.g., throughout a printing process. This may be useful, for example, if there is a mixture of different weights of paper loaded in the same tray. For example, the weight value is measured for each sheet or for every fifth, tenth or other number of sheets.

Figure 7:
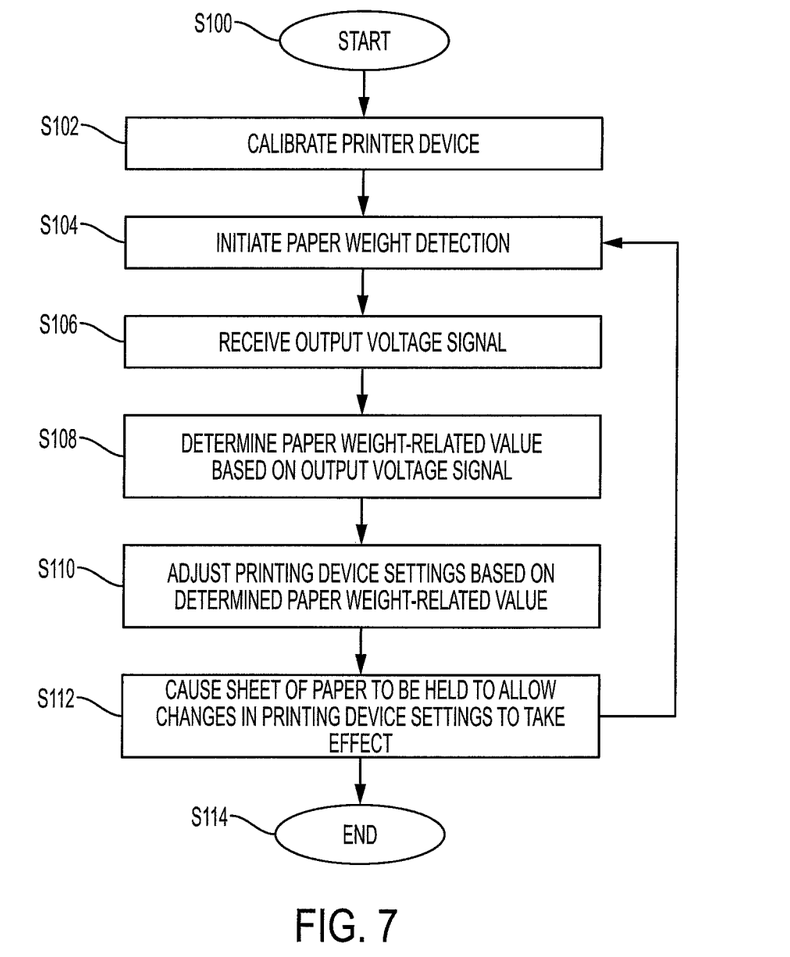
FIG. 7 is a flow chart which illustrates a method of operating a printing device in accordance with another aspect of the exemplary embodiment.

With reference now to FIG. 7, a method of printing, which can be performed with the illustrated printing device 10 is shown. The method starts at S100.

At S102, the printing device is calibrated, e.g., by the calibration component 58. This may be performed by the manufacturer and/or by a user. In this step, each of a set of two, three, or more paper weight ranges (bins) is associated with a respective range of sensor outputs, e.g., range of rise times. This information may be stored in memory 62 accessible to the weight output component 24 of the control unit 64. The printing device 10 may be calibrated for a single paper speed or for a plurality of paper speeds, such as two, three, or more paper speeds.

At S104, an action may be detected by the control unit 64 which initiates a paper weight determination. The action may be the opening/shutting of a door/drawer of the media supply component 80, e.g., detected with a movement sensor, an increase in weight of one of the drawers 82, 84, 86, e.g., detected by a weight detection component, a detection that a fixed number of sheets have been processed, indicating that the next sheet is to be tested, or the detection of a sheet in the paper path, by the sensor system 22 or other sensing device.

At S106, a voltage signal 28 is output by the sensor system 22 in response to the deflection of the flexible member 26 and received by the control unit 64.

At S108, a paper weight-related value 14, such as one of a set of paper weight bins, is determined by the weight output component 24 and output to the adjustment component 54.

At S110, printing device settings are adjusted by the adjustment component 54, based on the paper weight-related value 14. If the paper weight-related value 14 is unchanged from the previously-determined paper weight-related value, the settings need not be adjusted. If, however, the determined paper weight bin is different, or there is no prior paper weight-related value, then one or more adjustments to the printing device settings are made. The adjustments may include one or more of:

1. Adjusting various sheet feeding devices (e.g., rollers, belts, baffles, etc.) within the printing device so that the current type of print media will move at the correct velocity, contact the printing elements properly, and will not become jammed within the printer;

2. Adjusting the sheet transfer voltage; and

3. Adjusting the fuser, e.g., the fuser roll temperature and/or pressure.

Optionally, at S112, the sheet 16 of paper is held in the paper path for a few milliseconds or up to one or two seconds, to allow the printer setting changes to be effected.

The method may return to S104 for another paper weight detection and adjustment cycle, or continue to S114, e.g., if printing has ended.

The method ends at S114.

The method illustrated in FIG. 7 may be implemented, at least in part, in a computer program product that may be executed on a computer, such as the illustrated control unit 64. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The computer implemented steps of the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 7 can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Advantages of the exemplary film sensor include that it is inexpensive, the construction is not critical, and it is not prone to failure due to contamination. It can also be integrated into existing components in the paper path, such as in the embodiment of FIG. 4, reducing the need for an additional flexible member. Additionally, the strain gauge need not have a high accuracy as the deflection can be characterized and calibrated in the printing device.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A printing device comprising:
   a flexible member positioned in a print media pathway, which is deflected by a moving sheet to be printed;
   a sensor system which outputs signals in response to a detected deflection of the flexible member, the output signals comprising a pulse;
   a weight output component which outputs a weight-related value for the sheet based on the output signal; and
   an adjustment component which adjusts a setting of the printing device based on the weight-related value further comprising a calibration component which receives signals output by the sensor system in response to a detected deflection of the flexible member for a plurality of known sheet weights and calibrates the weight output component based thereon.

2. The printing device of claim 1, further comprising:
   a processor which implements the weight output component and adjustment component.

3. The printing device of claim 1, wherein the sensor system includes a strain gauge attached to the flexible member.

4. The printing device of claim 3, wherein the strain gauge forms a leg of a resistance circuit.

5. The printing device of claim 1, wherein the sensor system includes an analog to digital converter.

6. The printing device of claim 1, wherein the weight output component determines a rise time from the pulse, the weight-related value being based on the rise time.

7. The printing device of claim 6, wherein the determining of the rise time comprises computing a time difference between first and second times corresponding to first and second sensor outputs, each of the first and second times being prior to a time of a maximum sensor output.

8. The printing device of claim 1, wherein the flexible member is positioned in the print media pathway upstream of a marking device and downstream of a region in the print media pathway where sheets fed from a plurality of print media sources enter a common portion of the print media pathway.

9. The printing device of claim 1, wherein adjustment component adjusts at least one setting of at least one printer component selected from:
   a transfer component which transfers an image, in the form of electrically-charged toner particles, to the sheet;
   a fuser which affixes the transferred image to the sheet with heat; and
   a component which conveys the sheet along the print media pathway.

10. The printing device of claim 1, further comprising at least one of:
    a position detector which computes a position of the sheet based on the signal output by the sensor system; and
    a speed detector which computes a speed of the sheet based on the signal output by the sensor system.

11. The printing device of claim 1, wherein the flexible member includes a plurality of flexible members.

12. A printing device comprising:
    a flexible member positioned in a print media pathway, which is deflected by a moving sheet to be printed;
    a sensor system which outputs a signal in response to a detected deflection of the flexible member;
    a weight output component which outputs a weight-related value for the sheet based on the output signal, the weight-related value being one of a predetermined set of weight-related values; and
    an adjustment component which adjusts a setting of the printing device based on the weight-related value.

13. A printing method comprising:
    receiving a signal output by a sensor system associated with a flexible member positioned in a print media pathway of a printing device, when the flexible member is deflected by a moving sheet to be printed;
    determining a weight-related value for the sheet, based on the output signal; and
    adjusting a setting of at least one component of the printing device, based on the weight-related value; and
    after the adjusting, printing the sheet with the printing device, and
       wherein the receiving of the signal, the determining of the weight-related value, and the adjusting of the setting are repeated for at least one subsequent moving sheet, and/or
       wherein the sheet is caused to be held in the print media path to allow the at least one component to equilibrate after adjusting of the setting.

14. The method of claim 13, wherein the receiving of the signal, the determining of the weight-related value, and the adjusting of the setting are repeated for at least one subsequent moving sheet.

15. The method of claim 13, wherein the determining of the weight-related value for the sheet comprises determining a rise time from the output signal, the output signal including a pulse which increases to a maximum value and subsequently decreases, the weight-related value being assigned based on the rise time, the determining of the rise time comprises computing a time difference between first and second times corresponding to first and second sensor outputs, each of the first and second times being prior to a time of the maximum value of the pulse.

16. The method of claim 13, further comprising calibrating the printing device for computing the weight-related value, based on signals output by the sensor system in response to a detected deflection of the flexible member for a plurality of known sheet weights.

17. The method of claim 13, comprising the causing of the sheet to be held in the print media path to allow the at least one component to equilibrate after adjusting of the setting.

18. A dynamic print media weight detection system comprising:
- a sensor system which outputs a digital signal in the form of a pulse in response to a detected deflection of an associated flexible member positioned in a print media pathway of an associated printing device, when the flexible member is deflected by a moving sheet to be printed; and
- a weight output component which determines a rise time from the digital signal pulse and assigns a weight-related value to the sheet based on the rise time.

* * * * *